United States Patent Office 3,048,361
Patented Aug. 7, 1962

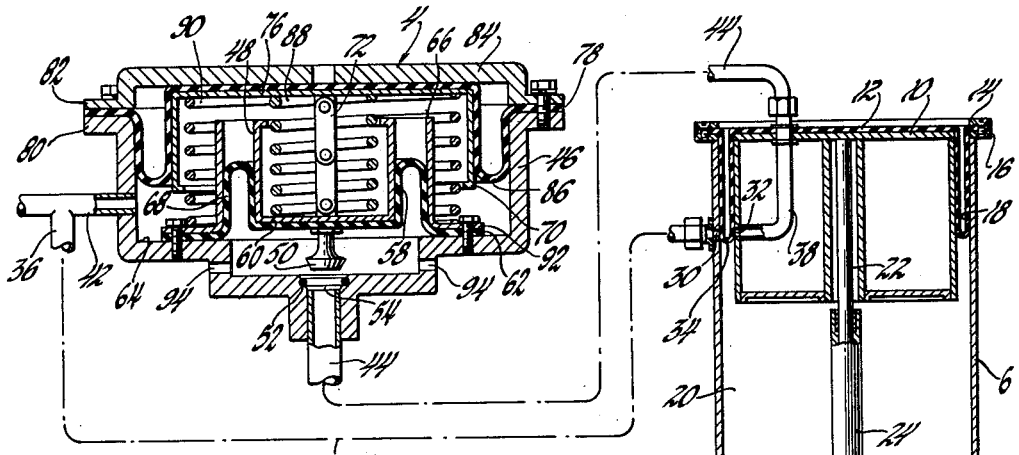
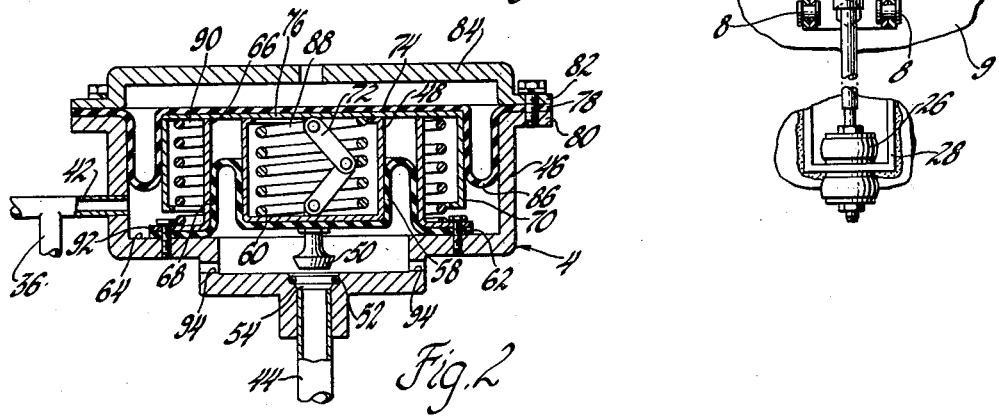
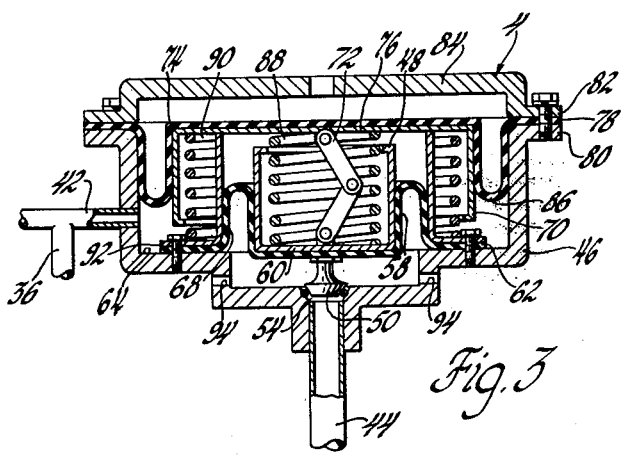

3,048,361
VACUUM SPRING CONTROL APPARATUS
Philip L. Francis, Pontiac, Mich., assignor to General Motors Corporation, Detroit, Mich., a corporation of Delaware
Filed Oct. 14, 1960, Ser. No. 62,742
7 Claims. (Cl. 251—61)

This invention relates to vehicle suspension and more particularly to suspension of the type utilizing self-leveling vacuum energized auxiliary springs for maintaining the sprung mass of the vehicle at a constant height irrespective of load.

Among the many advantages derived from use of vacuum energized auxiliary springs for vehicle suspension is the fact that the subatmospheric pressure required for energization may be taken directly from the engine manifold and therefore eliminates the usually substantial additional cost factor involved in providing a separate source of fluid pressure for variable rate springs of other types. However, under certain transient conditions of operation, engine manifold vacuum may drop below the level of vacuum in the auxiliary spring required to maintain the vehicle at the desired trim height. This condition could occur, for example, when the vehicle is traversing undulating steep terrain, causing the engine to lug and the wheels to deflect a substantial distance at relatively frequent intervals. Under such conditions, since the level of vacuum in the auxiliary spring is controlled by a height sensing valve, relatively frequent rebound of the suspension will cause the spring to lose the vacuum level required to maintain the vehicle at the desired trim height, while the engine load is such that insufficient vacuum is generated to restore the vacuum level when the spring is in the compression position.

An object of the present invention is to provide a control device for a vacuum spring which regulates communication between the vacuum spring and atmosphere in such a way that bleeding of air into the spring is prevented when the level of vacuum available from the source is low, but allows bleeding of air from atmosphere when the level of vacuum available for the source is normal.

Still another object is to provide a device of the type described which discriminates between a low vacuum source level and the total absence of vacuum at the source.

Yet a further object is to provide a device of the stated character in which bleeding of air from atmosphere into the vacuum spring is permitted when no vacuum exists at the source.

Still a further object is to provide a vacuum operated control valve which functions to allow flow under conditions of either no vacuum or a relatively high vacuum, but prevents flow under conditions of low vacuum.

These and other objects, advantages, and features of the invention will become more fully apparent as reference is had to the accompanying specification and drawings wherein:

FIG. 1 is a schematic view of a vacuum energized vehicle spring of the self-leveling type having associated therewith a vacuum modulated air bleed control device in accordance with the present invention, showing the details of construction of the vacuum modulated control device when no vacuum exists at the source thereof.

FIG. 2 is a sectional view of the vacuum modulated control, showing the relative position of the parts when the level of vacuum available from the source is at a normal level; and FIG. 3 is a view similar to FIG. 2, showing the relative position of the parts when the vacuum available from the source is low but not completely absent.

Referring now to the drawings and particularly FIG. 1, there is shown a vacuum energized spring 2 and control device 4 therefor. Spring 2 includes a cup-shaped cylinder 6 which is pivotally attached at its lower end by trunnions 8 to the sprung mass 9 of a vehicle, not shown. Cylinder 6 has reciprocably disposed therein an inverted cup-shaped piston 10, the diameter of which is somewhat less than the internal diameter of cylinder 6. A flexible diaphragm 12 overlies piston 10 and has its outer periphery 14 secured to the flanged open upper end 16 of cylinder 6. Diaphragm 12 includes an intermediate annular depending convolution 18 which overlaps the radially adjacent side walls of piston 10 and cylinder 6 to provide a closed cavity 20 adapted to contain varying degrees of subatmospheric pressure. Piston 10, in turn, has attached thereto a depending piston rod 22 which is slidably received in a sleeve portion 24 formed in the base of cylinder 6. Rod 22 extends downwardly through cylinder 6 and is articulatably connected by a flexible joint 26 to the unsprung mass 28 of the vehicle. In the preferred embodiment, the level of subatmospheric pressure in cavity 20 is automatically varied in accordance with the load applied to the sprung mass as a direct function of relative displacement between the piston 10 and cylinder 6 by the provision of a port 30 in the wall of cylinder 6 and a port 32 in the wall of piston 10. When the vehicle is at normal standing height, ports 30 and 32 are horizontally aligned and are simultaneously overlapped by the lower lobe portion 34 of diaphragm 18, with the result that the vacuum line or conduit 36 leading to the engine manifold, not shown, and air bleed conduit 38 leading to atmosphere are simultaneously blocked. It will be apparent that substantial deflection of piston 10 in one direction will uncover port 30 and allow increase in the vacuum level, while substantial deflection of the piston in the opposite direction will uncover port 32 to permit air to bleed from atmosphere and reduce the level of subatmospheric pressure in the spring. Thus, the vacuum level in the spring varies in accordance with the load applied and therefore maintains the vehicle at a constant trim height. It will be understood, however, that the specific form of leveling control described is for purposes of illustration only, any other form being equally adaptable to the present invention.

In accordance with the present invention, the normal self-leveling operation of the vacuum energized spring just described is overridden by the vacuum modulated control device 4 whenever the engine manifold vacuum drops below a predetermined level. As will be evident from FIG. 1, control device 4 is connected to the engine manifold by a branch conduit 42 and to the atmosphere bleed tube 38 of the vacuum spring by a flexible conduit 44.

As seen best in FIGS. 1, 2 and 3, control device 4 includes a cylindrical cup-shaped housing 46 in which is disposed an inner cup-shaped piston 48 having attached thereto a depending valve element 50 adapted for seating engagement with an O-ring 52 disposed in the mouth of a passage 54 which in turn is connected to conduit 44. An inner flexible diaphragm 58 overlies the bottom wall 60 of piston 48 and has its outer peripheral edge 62 clamped between the annular ledge 64 of housing 46 and a flanged cylindrical member 66 which surrounds piston 48 in concentric relation therewith. The intermediate portion 68 of diaphragm 58 forms an upwardly directed convolution extending between the radially adjacent walls of cylinder 66 and piston 48. An outer inverted cup-shaped piston 70 is disposed over cylinder 66 in concentric relation therewith and is connected to piston 48 by toggle linkage 72. An outer diaphragm 74 overlies the top wall 76 of piston 70 and has its peripheral edge 78 clamped between abutting flanges 80 and 82 of housing 46 and housing cover plate 84, respectively. The intermediate annular portion 86 of diaphragm 74 forms a downwardly directed convolution which overlaps the radially adjacent side walls of piston 70 and housing 46. A small diameter coil spring 88 is disposed in compression between piston 48 and piston 70, while a large diameter coil spring 90 is disposed in compression between piston 70 and the flange 92 of cylinder 66. In accordance with the invention, the rate of spring 90 is such that it yields in compression when a vacuum of approximately 1 inch of mercury, introduced through conduit 42, acts on piston 70. The rate of spring 88, however, is selected so that upward movement of piston 48 is prevented until the vacuum within housing 46 reaches a level of approximately 15 inches of mercury.

In order that the invention will be more fully understood, description of the sequence of operation thereof follows. Assume first that the vehicle engine, not shown, is not operating. Under this condition, there will obviously be no vacuum in the engine manifold and hence none will be created in either conduit 42 or housing 46. Consequently, spring 90 will bias piston 70 upwardly until arrested by cover plate 84. Simultaneously, toggle link 72 is extended to its full vertical length and carries piston 48 upwardly sufficient to withdraw valve 50 from O-ring 52. As a result, conduit 44 is placed in communication with atmosphere through bleed holes 94 in housing 46. Therefore, whenever the vehicle engine is not running, control device 4 exerts no overriding influence and the vacuum in spring 2 is entirely a function of the relative positions of ports 30 and 32 with respect to the adjacent diaphragm. Assume now that the vehicle engine has been started and is operating under a low load which permits the manifold to produce at least 15 inches of mercury in conduit 42. Under this condition, the vacuum level is greater than the resistance of both springs 88 and 90 and therefore, as shown in FIG. 2, piston 70 will be drawn downwardly in opposition to coil spring 90, while piston 48 will be drawn upwardly with opposition to coil spring 88 so that the clearance between valve 50 and seat 52 is maintained and thereby allows normal bleeding of atmosphere into the spring cylinder whenever the displaced position thereof opens port 32.

Assume now that the vehicle has encountered operating conditions wherein the engine is under sufficiently heavy load to reduce the manifold vacuum to a relatively low level, and that the vacuum spring 2 is deflecting at relatively frequent intervals a distance sufficient to uncover port 32 and cause bleeding of air from atmosphere into the cavity 20. Under these conditions, the relatively low level of vacuum in conduit 42 causes the control device to assume the position shown in FIG. 3 wherein the piston 70 is drawn downwardly against spring 90, but the level of vacuum in housing 46 is insufficient to overcome spring 88 and piston 48 therefore remains in the downward position causing valve 50 to seat firmly on O-ring 52 and prevent communication between conduit 44 and atmosphere via bleed holes 94. Consequently, as long as the stated operating condition continues, the vacuum level existing in the spring 2 at the inception of the condition will be maintained irrespective of whether port 32 is covered or uncovered by deflection of piston 10 relative to cylinder 6. Naturally, as soon as normal engine manifold vacuum resumes, spring 88 will be overcome and the control device will assume the position shown in FIG. 2 which restores normal operation of leveling entirely controlled by ports 30 and 32.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A vacuum modulated flow control device comprising, a housing having a port connected to a source of vacuum, a pair of pistons in said housing arranged in axially spaced relation, one of said pistons having a valve member movable therewith, means in said housing defining a flow passage, a valve seat in said flow passage axially aligned with and engageable by said valve member, a pair of diaphragms connected between said housing and said pistons so as to define a closed cavity communicating with said port, first resilient means biasing said one piston in the direction of said valve seat, second resilient means biasing said other piston in the opposite direction, and means connected between said pistons effective to positively limit opposite movement thereof.

2. A vacuum modulated flow control device comprising, a housing having a port connected to a source of vacuum, a pair of pistons in said housing arranged in axially spaced telescoping relation, one of said pistons having a valve member movable therewith, means in said housing defining a flow passage, a valve seat in said flow passage axially aligned with and engageable by said valve member, a pair of diaphragms connected between said housing and said pistons so as to define a closed cavity communicating with said port, first resilient means biasing said one piston in the direction of said valve seat, second resilient means biasing said other piston in the opposite direction, and means connected between said pistons effective to positively limit opposite movement thereof.

3. A vacuum modulated flow control device comprising, a housing having a port connected to a source of vacuum, a pair of pistons in said housing arranged in axially spaced telescoping relation, one of said pistons having a valve member movable therewith, means in said housing defining a flow passage, a valve seat in said flow passage axially aligned with and engageable by said valve member, a pair of diaphragms connected between said housing and said pistons so as to define a closed cavity communicating with said port, first resilient means biasing said pistons in opposite directions, second resilient means biasing said other piston in the direction away from said valve seat, and means connected between said pistons effective to positively limit opposite movement thereof.

4. The structure set forth in claim 3 wherein said first resilient means affords substantially higher resistance than said second resilient means.

5. The structure set forth in claim 4 wherein the ratio of resistance of said first and second resilient means is on the order of 10 to 1.

6. A vacuum modulated flow control device comprising, a housing having a port connected to a source of vacuum, a pair of pistons in said housing arranged in axially spaced telescoping relation, one of said pistons having a depending valve member axially movable therewith, means in said housing defining a flow passage, a valve seat in said flow passage axially aligned with and engageable by said valve member, a pair of diaphragms connected between said housing and said pistons defining a closed cavity between said pistons communicating with said port, first resilient means between said pistons biasing the latter away from each other, second resilient means between said housing and said other piston biasing the latter away from said valve seat, and lost motion linkage means connected between said pistons effective to establish a predetermined positive limit of axial separation of said one piston relative to said other piston.

7. The structure set forth in claim 6 wherein said other piston in the absence of vacuum in said cavity is movable in said housing under the influence of said second resilient means to a position which causes said valve to be displaced from said valve seat when said one piston is in said predetermined limit of axial separation.

References Cited in the file of this patent
UNITED STATES PATENTS

| | | |
|---|---|---|
| 2,710,162 | Snoddy | June 7, 1955 |
| 2,883,145 | Sage | Apr. 21, 1959 |
| 2,962,296 | Jackson | Nov. 29, 1960 |
| 2,965,389 | Dietrich | Dec. 20, 1960 |